United States Patent [19]
Dixon

[11] 3,962,477
[45] June 8, 1976

[54] STORING COMESTIBLES IN A CRYOGENIC LIQUID

[76] Inventor: David A. Dixon, One Arroyo Drive, Kentfield, Calif. 94904

[22] Filed: June 28, 1971

[21] Appl. No.: 157,676

Related U.S. Application Data

[63] Continuation of Ser. No. 713,163, March 14, 1968, abandoned.

[52] U.S. Cl.............................. 426/419; 426/524; 62/64
[51] Int. Cl.² .......................................... A23L 3/36
[58] Field of Search .......... 99/197; 62/62; 426/419, 426/524

[56] References Cited
UNITED STATES PATENTS

| | | |
|---|---|---|
| 2,583,697 | 1/1952 | Hendry, Jr. ........................... 99/189 |
| 3,210,947 | 10/1965 | Dubs et al. ............................. 62/13 |
| 3,246,478 | 4/1966 | Kornemann et al. .................. 62/13 |
| 3,269,133 | 8/1966 | Dixon .................................. 99/166 |
| 3,287,925 | 11/1966 | Kane ...................................... 62/57 |
| 3,447,334 | 6/1969 | Kemball ................................ 62/64 |

Primary Examiner—Norman Yudkoff
Assistant Examiner—C. Ribando
Attorney, Agent, or Firm—Townsend and Townsend

[57] ABSTRACT

A process for maintaining a mixture of liquified gases in a uniformly-dispersed state by subjecting the liquified gases to at least periodic vibration. The process is especially useful for maintaining as a uniform mixture, an inert fluid and up to a few percent, by total volume, of oxygen for periodic delivery to a storage compartment containing fresh perishable comestibles to prevent the degradation of the comestibles.

4 Claims, 1 Drawing Figure

U.S. Patent  June 8, 1976  3,962,477
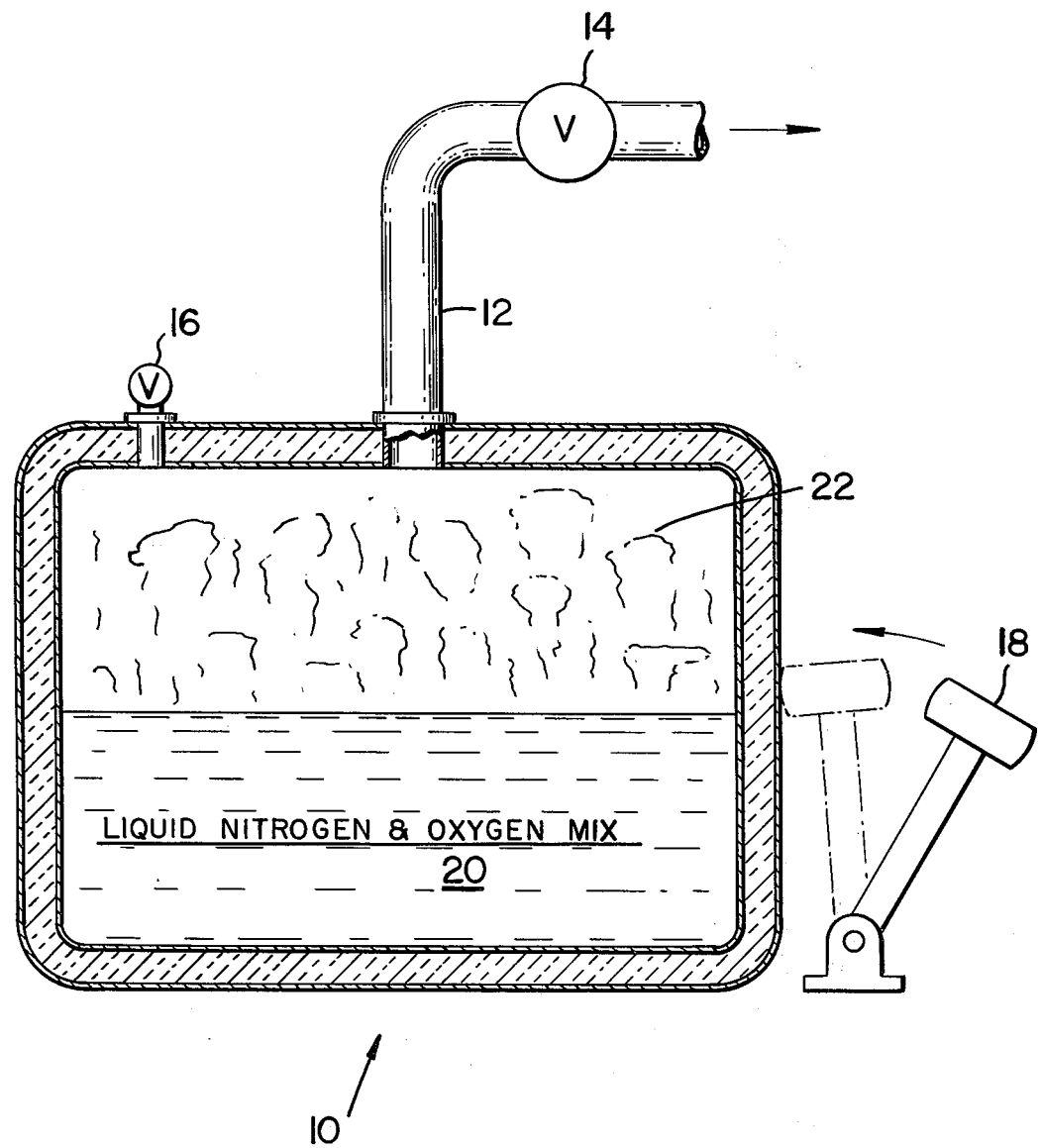
INVENTOR.
DAVID A. DIXON
BY
Townsend and Townsend
ATTORNEYS

STORING COMESTIBLES IN A CRYOGENIC LIQUID

This is a streamlined continuation application of Ser. No. 713,163, filed Mar. 14, 1968 and now abandoned.

This invention relates to a process for maintaining a uniform mixture of at least two liquified gases in a storage vessel. More particularly, the invention relates to a process for minimizing the deterioration of fresh perishable comestibles by providing a beneficial environment during storage and transportation thereof prior to ultimate consumer distribution.

The use of refrigeration to retain the freshness of stored meats, poultry, flowers, fruits and vegetables by retarding the rate of oxygen respiration thereof and bacterial, fungus and mold growth thereon has long been practiced. More recently, it has been determined that reducing the oxygen concentration of the surrounding environment also descreases the rate of oxygen respiration of, and bacterial, fungus and mold growth on, the fresh comestibles. However, complete exclusion of oxygen is not entirely desirable. The reason for this is that when the gaseous environment surrounding respiring comestibles is too low in oxygen, i.e., contains less than about one-half percent oxygen, anaerobic respiration results, causing serious product degradation. Thus, recent commercial developments in fresh fruit and vegetable storage have been directed to the use of an environment having a critical range of oxygen concentration; see, for example, U.S. Pat. No. 3,239,360, issued Mar. 8, 1966, wherein an environment containing oxygen in a concentration of from about one-half percent to about four percent is disclosed.

With respect to fresh meat, meat products, poultry, eggs, cheese and seafood, similar advantages have been obtained when these products are transported and stored under controlled relative humidity and temperature in a low oxygen-high nitrogen environment. In this manner, surface spoilage and bacterial fungus and mold growth is reduced while permitting complete time-tenderization through aging, and product oxidation is retarded. Thus, the products retain color "bloom" and/or other desirable market qualities throughout storages and during normal post-storage marketing periods.

Control of oxygen concentration in conventional storage compartments is presently accomplished in a number of ways, the most common being the use of an oxygen sensing device in combination with separate sources of nitrogen and oxygen. In operation, when the oxygen concentration rises above the desired maximum, the sensing device, disposed within the storage compartment, activates a valve controlling the nitrogen source. As a result, a sufficient quantity of nitrogen is introduced to reduce the oxygen concentration to within the desired range. Conversely, when the oxygen concentration falls below the minimum required, the sensing device either similarly activates a valve controlling the oxygen source or deactivates the nitrogen source. In the latter case, and through utilization of a permeable storage unit, the oxygen source can be ambient air that diffuses into the compartment when the nitrogen source is deactivated.

In this manner, increments of oxygen or nitrogen are provided to the storage compartment in response to the appropriate signal from the sensing device to maintain the oxygen concentration in the desired range. However, such prior art procedures are of limited application as they are by necessity of elaborate and costly construction and somewhat unreliable. Although systems utilizing either a single storage tank containing a pre-mixture of oxygen and an inert gas such as nitrogen, or separate oxygen and inert gas tanks have been developed, the high pressure storage tanks required are very heavy and greatly increase the weight and space burden when used in in-transit applications. In addition, such systems suffer from the inherent problems associated with operation at high pressure.

Attempts to store mixtures of gases in a uniformly mixed liquified form under low pressure have not heretofore been successful as the individual liquified gases tend to vaporize and vent or be drawn off according to boiling point during prolonged standing. Inherent heat leakage into the storage vessel causes the component that has the lowest boiling point to vaporize first. When the contents of an insulated container include liquid oxygen and liquid nitrogen, for example, the nitrogen will tend to boil off first and the oxygen last. Thus, the oxygen content of the composition withdrawn from the storage vessel over a prolonged period of time will be unreliable. Although periodic mechanical agitation of such a liquified source mixture may be utilized to maintain a uniform dispersion, the use of stirring devices and the like within the source or storage tank creates heat and heat leakage that cause excessive vaporization of the fluid. In addition, rolling, rocking slowly, or alternately laying down and standing up of the storage vessel is usually inconvenient and costly.

It has now been found that by subjecting a liquified mixture of gases such as nitrogen and oxygen to continuous or at least periodic vibrations, the liquified mixture can be maintained in a uniformly-dispersed condition. It has also been found that when such a liquified mixture is held uniform within a storage vessel by the application of this vibration technique, the composition of the vaporized gas mixture within the vapor space of such vessel will be similarly uniform, and identical in composition to that of the liquified mixture. Thus, the composition of gas withdrawn from the storage vessel will exhibit the actual relative concentrations of component gases of the stored liquified mixture itself. As a result, when a proper liquified mixture is created for the preservation of fresh, perishable comestibles, the gaseous composition released from the stored mixture supply within the storage vessel will be uniform and effective during the entire life of the supply.

In another aspect, it has been found that this inventive concept has broad application, as any mixture of gases stored in a liquified condition may be maintained as a uniform dispersion by the instant process. In particular, the relative ease of maintaining a uniform dispersion of the liquified components has been found to be inversely proportional to the difference between the boiling points, i.e., the closer the boiling points of the gases, the easier it is to maintain uniform dispersion in the liquified state. Gases having boiling points that differ by less than 60° C., preferably up to 25° C., are most easily maintained as a uniform liquid dispersion. Thus, hydrocarbons such as methane, ethane and propane, for example, may be liquified to reduce storage problems and thereafter be maintained in a uniformly-dispersed condition by vibrating the storage vessel.

Other aspects of this invention will be apparent when reference is made to the attached drawing representing a sectional view of one embodiment of this invention.

The extent of vibration required to retain the liquified gases in a state of uniform dispersion will vary widely depending upon actual conditions. However, as a practical matter, vibrating the liquified gas storage vessel at a frequency from about 250 cycles per second to ultrasonic frequencies greater than 20,000 cycles per second, has been found useful. In some cases, the resonant frequency of the storage vessel will be satisfactory.

The rate of periodic energization necessary to impute the desired frequency of vibration to the storage vessel will also vary widely. For example, resonant frequency may be generated by energizing the storage vessel, if made of metal, as little as one time per two seconds. However, the required energizing frequency will usually be higher, i.e., up to 720 cycles per second and above. An energizing frequency of from 4 to 100 cycles per second has been found to be especially preferable. The intensity (amplitude) of the vibrations will also contribute to the uniform dispersion of the liquified gases, i.e., with greater amplitudes of vibrations, correspondingly lower frequencies may be employed.

In actual practice, most vehicles such as ships, trucks and the like, inherently transmit vibration and/or provide periodic energization during those intervals when they are being moved. This is true because of vibration from the power plant of the vehicle, vibration and energy shock from the jolts and jars resulting from the surface that the vehicle traverses, and swaying or rolling action either due to spring suspension or movement that would be expected with aircraft or nautical ships. This type of vibration and/or periodic energization to cause vibration, of the storage vessel, is usually sufficient to maintain the liquid components within the vessel adequately mixed so that they will be discharged as a uniformly-dispersed mixture in either liquid or gaseous form. However, during intervals when the storage vessel is in a static condition, i.e., not being transported on or in such a vehicle that is in motion, a means for vibrating the storage vessel must be provided.

To expedite the description of this invention, the remainder of this specification will be directed to the description of a specific embodiment for providing a uniformly-dispersed mixture of oxygen and an inert gas such as nitrogen from a liquified source thereof to create a favorable environment during the storage and transportation of fresh perishable comestibles. Nitrogen is especially advantageous, not only because it is readily available, but because its boiling point −320.4° F is very similar to the boiling point of oxygen −297.3° F. Although general reference will hereinafter be made to the use of nitrogen, other well-known inert fluids such as helium, argon, neon and the like, or mixtures thereof, may also be satisfactorily employed.

In the application of the concept of this invention to the preservation of fresh comestibles, a substantially airtight storage compartment containing the fresh perishable comestibles is first purged with a sufficient amount of a uniformly-dispersed mixture of nitrogen and oxygen (or nitrogen alone) to displace substantially all of the air originally occupying the storage compartment. Suitable mixtures for use with respiring comestibles such as fresh fruits and vegetables employ oxygen in concentration, by volume, of up to 4% and preferably about 1% to 2%. With fresh meat, seafood, poultry and non-restricting comestibles, oxygen concentrations of about 0.01% to 0.2% are preferred. The desired level of oxygen concentration is thereafter maintained by the continuous or periodic introduction of additional quantities of gaseous nitrogen and oxygen sufficient to maintain the aforementioned concentrations from a liquified source in an insulated storage vessel. The liquified gases are maintained uniformly dispersed through at least periodic vibration of the liquified source either intentionally or inherently applied to the insulated storage vessel.

The process of this invention has the added advantage of producing a continuous positive pressure within the compartment. This prevents unintentional leakage of oxygen-rich air into the storage compartment through the walls and doors of the compartment. When the storage compartment is actually completely airtight, an outlet valve may be employed to allow for release of gas from the compartment. The continued introduction of the pressurized uniformly-dispersed mixture will also diminish buildup of various gases such as carbon dioxide and ethylene that may be formed by or released from stored comestibles.

The insulated storage vessel can take any form, but it is advantageous to utilize a conventional vacuum, insulated cylinder or storage tank with standard outlet valve openings. It is desirable that such storage vessel employ a safety pressure valve to prevent explosion of the vessel should internal pressures exceed the actual strength of the vessel walls.

Referring now to the drawing, numeral 10 identifies an insulated storage vessel or tank of conventional design and metal construction. Tank 10 includes outlet line 12 having valve 14 for metering gas mixtures from the tank to a compartment such as that utilized in the storage of fresh perishable comestibles. Tank 10 also includes a safety valve 16 for releasing excess gas that may be created through heat transfer into tank 10. Vibration initiator 18 is positioned in close proximity to tank 10 to provide periodic initiation or reinforcement of the vibration of tank 10.

In operation, tank 10 is partially filled with liquified gases 20. Tank 10 is maintained in a condition of steady vibration by the application of a periodic external driving force by initiator 18. Thus, the gaseous composition 22 occupying the volume of tank 10 above liquified gases 20 will correspond in concentration to that present in liquified gases 20. Although initiator 18 is illustrated in the form of a reciprocally-mounted hammer, various other conventional devices presently available for imparting vibration to the outer shell of tank 10 may also be employed.

The present process is useful for retarding deterioration during storage of the fresh comestibles at temperatures including room temperature and above. However, further advantages for some comestibles are obtained when the temperature within the storage compartment is reduced to below about 35° F. or even lower. Again, although the relative humidity within the storage compartment is not critical to this invention, high moisture content, i.e., a relative humidity in excess of 90%, is very beneficial to maintaining certain comestibles without significant deterioration.

The type of storage compartment useful in the practice of the present invention can obviously be varied widely in size, shape, construction and design and includes those compartments which are to be used for storage and/or transportation. Preferably the storage compartment will be a conventional movable vehicle such as a semi-trailer, railroad car, ship, airplane and the like, but can include compartments such as a plastic bag or wooden box.

The term "perishable comestibles" is intended to include all types of animal and plant products which are subjected to degradation during storage thereof. These include among the others which could be listed, vegetables such as lettuce, celery, cabbage and the like; fruits, such as apples, oranges, tomatoes, and the like; nuts, such as pecans, chestnuts, walnuts and the like; animal products such as fresh meat, seafood, poultry and fish, as well as eggs and other dairy products such as cheese; flowers, such as carnations and roses; as well as mushrooms and other parasitic plants and the like.

To further illustrate the novel process of this invention, the following examples are provided.

EXAMPLE I

A conventional trailer truck having a refrigerated compartment was equipped in fluid and mechanical communication with an insulated shock resistant tank containing a mixture of liquified nitrogen and about 1% by volume of liquified oxygen. The compartment was filled with crates of freshly picked lettuce cooled to 35° F. and the compartment closed and maintained at this temperature. About 5,000 cubic feet of the oxygen-nitrogen mixture were released into the compartment to "purge" the ambient atmosphere therefrom. The release valve on the tank was then adjusted to deliver about two cubic feet per minute of the gaseous mixture as the truck was moving between its point of origin and its destination. The contents of the truck were treated in this manner for a two-week period during which time the insulated tank was maintained in a state of vibration by the truck's motor. Vibration of the tank was checked periodically during the two-week period and found to be mainly in the 1000 cps. range. At the end of a two-week period, the contents of the transported compartment were examined and found to be in excellent condition with no apparent degradation of the lettuce. An analysis of the gas composition still being released from the insulated tank at that time revealed that the mixture was still uniformly dispersed, as the sample tested contained 1% by volume of oxygen and 99% by volume of nitrogen.

EXAMPLE II

In a manner similar to Example I, a larger storage compartment was loaded with lettuce. To an insulated 30-gallon tank of liquified nitrogen and 1% by volume of liquified oxygen was attached four simple 12-volt door buzzers operating on less than 1/20 watt of electrical power. The door buzzers were activated, causing the insulated tank to vibrate slightly. Gas was withdrawn from the tank and introduced into the storage compartment during a two-week period. At the end of this period, the contents of the compartment displayed little degradation. Analysis of the gas being released from the tank revealed that the desired 1% concentration of oxygen was still being provided.

EXAMPLE III

A bag of 2 cubic feet capacity, made of 2 mil polyethylene film, was equipped in fluid communication with an insulated shock resistant tank containing a mixture of liquified nitrogen and about 0.1% by volume of liquified oxygen. Into the bag was then placed a 1½ cubic foot piece of fresh beefsteak, one day old, which had been chilled to 45° F. The bag was then sealed except for a small vent hole of about 1/32 inch diameter, and placed in the refrigerated hold of a ship held at 35° F. The storage tank was fastened firmly to the deck of the ship, and the release valve on the tank was then adjusted to deliver about one-half cubic foot per hour of the gaseous mixture as the ship was moving between its point of origin and its destination. The contents of the bag were treated in this manner for a three week period during which time the insulated tank was maintained in a state of vibration by the ship's engines. At the end of a three week period, the contents of the transported bag were examined and found to be in excellent condition with no apparent degradation of the beefsteak. In addition, the beefsteak had become significantly more tender; no mold or appreciable amount of bacteria had grown on its surface; it had lost no weight from dehydration; and after subsequent exposure to air for a one hour period essentially all of the fresh red color, or "bloom", which it had exhibited when placed initially within the bag, displayed itself again. An analysis of the gas composition still being released from the insulated tank at that time revealed that the mixture was still uniformly dispersed, as the sample tested contained 0.1% by volume of oxygen and 99.9% by volume of nitrogen.

Although the foregoing invention has been described in some detail, by way of illustration and examples for purposes of clarity and understanding, it is understood that certain changes and modifications may be practiced within the scope of the invention as limited only by the scope of the appended claims.

What is claimed is:

1. A process for inhibiting degradation of fresh perishable comestibles while stored in a substantially enclosed compartment, comprising the steps of: providing a chamber at least partially filled with a liquid mixture containing not less than 0.1 percent and not more than four percent liquified oxygen by total volume, the remainder being substantially all liquified nitrogen; at least periodically imparting vibration to said chamber by movement of a hammer against said chamber during the transportation thereof to maintain said liquified oxygen in uniform dispersion throughout said liquified nitrogen, said vibration being imparted to said chamber to produce vibraton of said liquid mixture at a frequency of from about 250 cycles per second to greater than 20,000 cycles per second; storing comestibles in said compartment; vaporizing a portion of the liquified mixture; and introducing said vaporized portion of said mixture into said compartment during the continued storage of said comestibles therein.

2. A process for retarding the rate of respiration of perishable cometsibles while stored in a substantially enclosed compartment, compriing the steps of: providing a chamber at least partially filled with a liquid mixture containing not less than 0.1 percent and not more than four percent liquified oxygen by total volume, the remainder being substantially all liquified nitrogen; at least periodically imparting vibration to said chamber to maintain said liquified oxygen in uniform dispersion throughout said liquified nitrogen, said vibration being imparted to said chamber by movement of a hammer against said chamber during the transportation thereof to produce vibration of said liquid mixture at a frequency of from about 250 cycles per second to greater than 20,000 per second; storing comestibles in said compartment; vaporizing a portion of the liquified mixture; and introducing said vaporized portion of said mixture into said compartment during the continued storage of said comestibles therein.

3. A process for retarding the rate of respiration of perishable combustibles while stored in a substantially enclosed compartment, comprising the steps of: providing a chamber partially filled with a liquid mixture containing not less than ¼ percent and not more than four percent liquified oxygen by total volume, the remainder being substantially all liquified nitrogen; at least periodically striking said chamber to maintain said liquified oxygen in uniform dispersion throughout said liquified nitrogen; storing comestibles in said compartment; vaporizing a portion of the liquified mixture; displacing substantially all of the air from said compartment with said vaporized portion, and thereafter continuing the vaporization of said liquified mixture to provide additional vapor for introduction to said compartment during the continued storage of said comestibles therin to retard said rate of respiration.

4. A process for inhibiting degradation of fresh perishable comestibles stored in a substantially enclosed compartment, comprising the steps of: providing a chamber partially filled with a uniform dispersion of a liquified mixture containing not less than ¼ percent and not more than four percent of liquified oxygen, the remainder being a liquified nitrogen; storing said comestibles in said compartment: vaporizing a portion of said liquified mixture; introducing said vaporized portion of said mixture into said compartment while striking the chamber containing said mixture to maintain said uniform liquid dispersion; and continuing the introduction of portions of said vaporized portion for a time period corresponding to the time period during which said comestibles are stored in said compartment.

* * * * *